United States Patent
Charest et al.

(10) Patent No.: US 12,325,159 B2
(45) Date of Patent: Jun. 10, 2025

(54) CONTINUOUS COMPRESSION MOLDING MACHINES AND METHODS OF CONTINUOUS COMPRESSION MOLDING A CONSOLIDATED THERMOPLASTIC MATRIX COMPOSITE MATERIAL

(71) Applicant: The Boeing Company, Arlington, VA (US)

(72) Inventors: Trevor David Charest, St. Louis, MO (US); Aaron Ross Cowin, Dardenne Prairie, MO (US); Gregory James Schoepen Hickman, Charleston, SC (US); Justin Joseph Schell, St. Charles, MO (US); Randall Dow Wilkerson, O'Fallon, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/397,871

(22) Filed: Dec. 27, 2023

(65) Prior Publication Data
US 2024/0123657 A1 Apr. 18, 2024

Related U.S. Application Data

(63) Continuation of application No. 17/669,200, filed on Feb. 10, 2022, now Pat. No. 11,904,510.

(51) Int. Cl.
*B29C 43/26* (2006.01)
*B29C 43/44* (2006.01)
*B29C 43/52* (2006.01)
*B29C 70/50* (2006.01)

(52) U.S. Cl.
CPC ............ *B29C 43/265* (2013.01); *B29C 43/44* (2013.01); *B29C 43/52* (2013.01); *B29C 70/50* (2013.01);
(Continued)

(58) Field of Classification Search
CPC ....... B29C 43/265; B29C 43/44; B29C 43/52; B29C 70/50; B29C 43/58;
(Continued)

(56) References Cited

U.S. PATENT DOCUMENTS

| | | | | |
|---|---|---|---|---|
| 4,956,140 A | * | 9/1990 | Rolles | B29C 48/305 |
| | | | | 264/177.17 |
| 5,053,180 A | * | 10/1991 | Wang | B29C 55/12 |
| | | | | 425/DIG. 53 |

(Continued)

FOREIGN PATENT DOCUMENTS

DE 4017978 C2 12/1991

OTHER PUBLICATIONS

Machine generated English language translation of German Patent No. DE 4017978 C2, issued Dec. 12, 1991.

(Continued)

*Primary Examiner* — Jeffrey M Wollschlager
(74) *Attorney, Agent, or Firm* — Kolitch Romano Dascenzo Gates LLC

(57) ABSTRACT

Continuous compression molding machines (CCMMs) and methods of continuous compression molding a consolidated thermoplastic matrix composite material are disclosed herein. The CCMMs include a mold, a heat zone heating structure, a consolidation zone heating structure, and a stress relaxation zone heating structure. The CCMMs also include a press structure, a demold structure, and a supply structure. The methods include providing a thermoplastic matrix composite material (TMCM) that includes a thermoplastic material to a CCMM. During the providing, the methods also include heating the TMCM within a heat zone of the CCMM, cooling and consolidating the TMCM within a consolidation zone of the CCMM, relaxing stress within the TMCM within a stress relaxation zone of the CCMM, (Continued)

demolding the TMCM within a demold zone of the CCMM at a mold temperature that is greater than a glass transition temperature of the thermoplastic material, and periodically compressing the TMCM.

20 Claims, 4 Drawing Sheets

(52) U.S. Cl.
 CPC .......................... *B29K 2995/0039* (2013.01); *B29K 2995/004* (2013.01)

(58) Field of Classification Search
 CPC .... B29C 2043/5808; B29C 2043/5816; B29C 2043/5875; B29C 43/34; B29C 2043/5833; B29C 43/22; B29K 2995/0039; B29K 2995/004; B29K 2101/12; B29K 2105/06
 See application file for complete search history.

(56) References Cited

U.S. PATENT DOCUMENTS

| | | | |
|---|---|---|---|
| 6,087,640 A * | 7/2000 | Gillespie | ................ H05B 6/365 219/615 |
| 8,491,745 B2 | 7/2013 | Wilkerson et al. | |
| 10,414,107 B2 | 9/2019 | Wilkerson et al. | |
| 10,449,736 B2 | 10/2019 | Prebil et al. | |
| 10,773,430 B2 | 9/2020 | Steinacher et al. | |
| 10,821,651 B2 | 11/2020 | Childers et al. | |
| 2005/0167866 A1 | 8/2005 | Hennessey et al. | |
| 2005/0238865 A1 | 10/2005 | Konishi | |
| 2012/0100339 A1 * | 4/2012 | Haynes | ................. B29C 48/001 264/165 |
| 2014/0014274 A1 | 1/2014 | Wilkerson et al. | |
| 2018/0236732 A1 * | 8/2018 | Childers | ............... B29C 51/266 |
| 2018/0236734 A1 | 8/2018 | Childers et al. | |
| 2018/0311916 A1 * | 11/2018 | Wilkerson | ........... B29C 70/526 |
| 2020/0047434 A1 | 2/2020 | Prebil et al. | |
| 2020/0156333 A1 | 5/2020 | Childers et al. | |
| 2020/0180243 A1 * | 6/2020 | Okamoto | .............. B29C 70/462 |
| 2020/0368945 A1 * | 11/2020 | Steinacher | .............. B29C 43/44 |
| 2024/0149503 A1 * | 5/2024 | Okumura | ................ B29C 43/34 |

OTHER PUBLICATIONS

European Patent Office, Extended European Search Report for related Europe Application No. 23155393 dated Jul. 5, 2023.

* cited by examiner

CONTINUOUS COMPRESSION MOLDING MACHINES AND METHODS OF CONTINUOUS COMPRESSION MOLDING A CONSOLIDATED THERMOPLASTIC MATRIX COMPOSITE MATERIAL

RELATED APPLICATIONS

The present application is a continuation patent application and claims priority to U.S. patent application Ser. No. 17/669,200, which issued on Feb. 20, 2024 as U.S. Pat. No. 11,904,510, is entitled CONTINUOUS COMPRESSION MOLDING MACHINES AND METHODS OF CONTINUOUS COMPRESSION MOLDING A CONSOLIDATED THERMOPLASTIC MATRIX COMPOSITE MATERIAL and was filed on Feb. 10, 2022. The complete disclosure of which is hereby incorporated by reference.

FIELD

The present disclosure relates generally to continuous compression molding machines and to methods of continuous compression molding a consolidated thermoplastic matrix composite material.

BACKGROUND

Continuous compression molding machines may be utilized to form a thermoplastic material into a desired shape. Continuous compression molding machines may utilize a pair of opposed die, a heating assembly, and a cooling assembly. The heating assembly heats the thermoplastic material at an entrance to the die, thereby permitting the thermoplastic material to mold and/or flow to the shape of the die. The die periodically separate, thereby permitting the thermoplastic material to be advanced through the continuous compression molding machine, and move together, thereby pressing the thermoplastic material into shape, which is defined by the die. In conventional continuous compression molding machines, the cooling assembly is utilized to cool the thermoplastic material to a temperature that is below a glass transition temperature of the thermoplastic material prior to separation of the thermoplastic material from the die. While effective in certain circumstances, this process may cause a build-up of stresses within the thermoplastic material, which may cause the thermoplastic material to warp, to twist, and/or to deform subsequent to separation from the die. To account for this deformation, die of conventional continuous compression molding machines may utilize complex shape compensation strategies within which the shape of the thermoplastic material, as defined by the die, differs from the desired shape. Die that include shape compensation strategies are difficult to accurately build and/or only may be effective in certain circumstances, and small changes in one or more process parameters may render the shape compensation ineffective. Thus, there exists a need for improved continuous compression molding machines and methods of continuous compression molding a consolidated thermoplastic matrix composite material.

SUMMARY

Continuous compression molding machines (CCMMs) and methods of continuous compression molding a consolidated thermoplastic matrix composite material are disclosed herein. The CCMMs include a mold, a heat zone heating structure, a consolidation zone heating structure, and a stress relaxation zone heating structure. The CCMMs also include a press structure, a demold structure, and a supply structure. The mold is configured to shape a thermoplastic matrix composite material (TMCM), which includes a thermoplastic material, to a desired shape for a consolidated thermoplastic matrix composite material. The heat zone heating structure is configured to heat a heat zone of the mold to a heat zone temperature that is selected to heat the TMCM to an initial temperature that is above a melt temperature for the thermoplastic material. The consolidation zone heating structure is configured to heat a consolidation zone of the mold to a consolidation zone temperature that is selected to cool the TMCM to a subsequent temperature. The stress relaxation zone heating structure is configured to maintain a stress relaxation zone of the mold at a stress relaxation zone temperature that is selected to maintain the TMCM at a stress relaxation temperature. The press structure is configured to periodically compress the TMCM, within the mold, to form the TMCM to the desired shape. The demold structure is configured to demold the TMCM from the mold while the TMCM is at a demold temperature that is greater than a glass transition temperature of the thermoplastic material. The supply structure is configured to periodically advance the TMCM through the mold.

The methods include providing a thermoplastic matrix composite material (TMCM) that includes a thermoplastic material to a CCMM. During the providing, the methods also include heating the TMCM within a heat zone of the CCMM, cooling and consolidating the TMCM within a consolidation zone of the CCMM, relaxing stress within the TMCM within a stress relaxation zone of the CCMM, demolding the TMCM within a demold zone of the CCMM, and periodically compressing the TMCM. The heating the TMCM includes heating to an initial temperature that is above a melt temperature of the thermoplastic material. The cooling and consolidating the TMCM includes cooling to a subsequent temperature. The relaxing stress within the TMCM includes relaxing stress at a stress relaxation temperature. The demolding the TMCM includes demolding from a mold of the CCMM and at a demold temperature that is greater than a glass transition temperature of the thermoplastic material. The periodically compressing the TMCM includes periodically compressing the TMCM with the mold to form the TMCM to a desired shape for the consolidated thermoplastic matrix composite material.

DESCRIPTION

Figure 1:
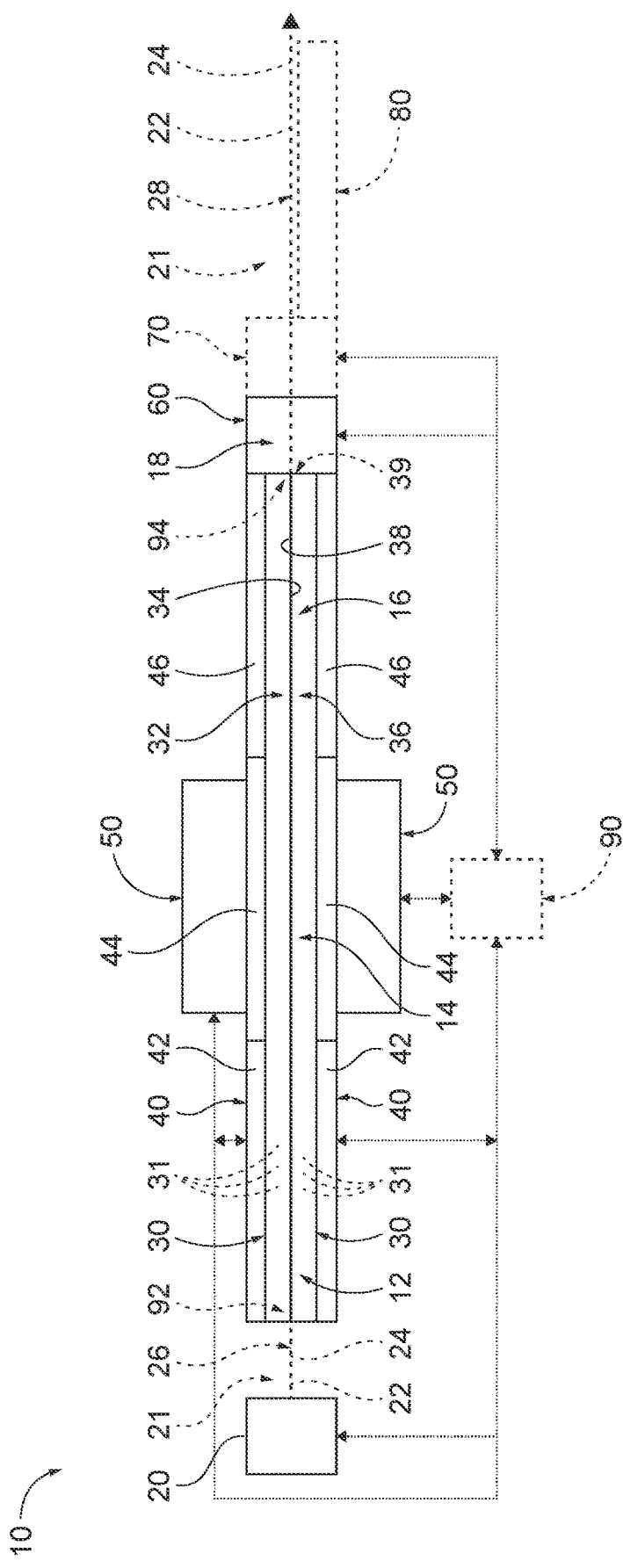
FIG. 1 is a schematic illustration of examples of continuous compression molding machines according to the present disclosure.

FIGS. 1-4 provide illustrative, non-exclusive examples of continuous compression molding machines 10 and/or of methods 200, according to the present disclosure. Elements that serve a similar, or at least substantially similar, purpose are labeled with like numbers in each of FIGS. 1-4, and these elements may not be discussed in detail herein with reference to each of FIGS. 1-4. Similarly, all elements may not be labeled in each of FIGS. 1-4, but reference numerals associated therewith may be utilized herein for consistency. Elements, components, and/or features that are discussed herein with reference to one or more of FIGS. 1-4 may be included in and/or utilized with any of FIGS. 1-4 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
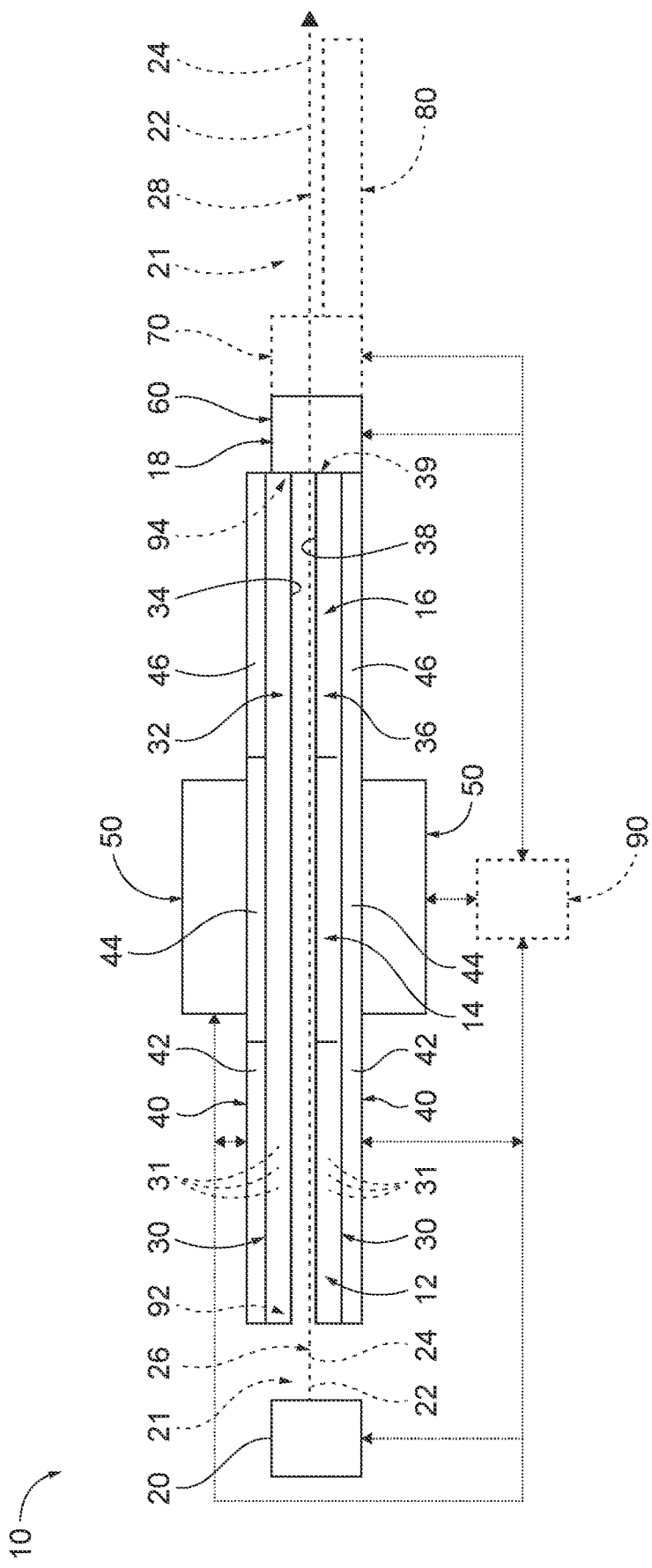
FIG. 2 is a schematic illustration of examples of continuous compression molding machines according to the present disclosure.

FIGS. 1-2 are schematic illustrations of examples of continuous compression molding machines (CCMMs) 10 according to the present disclosure. As illustrated in FIGS. 1-2, CCMMs 10 include a supply structure 20, a mold 30, a heating structure 40, a press structure 50, and a demold structure 60.

Figure 3:
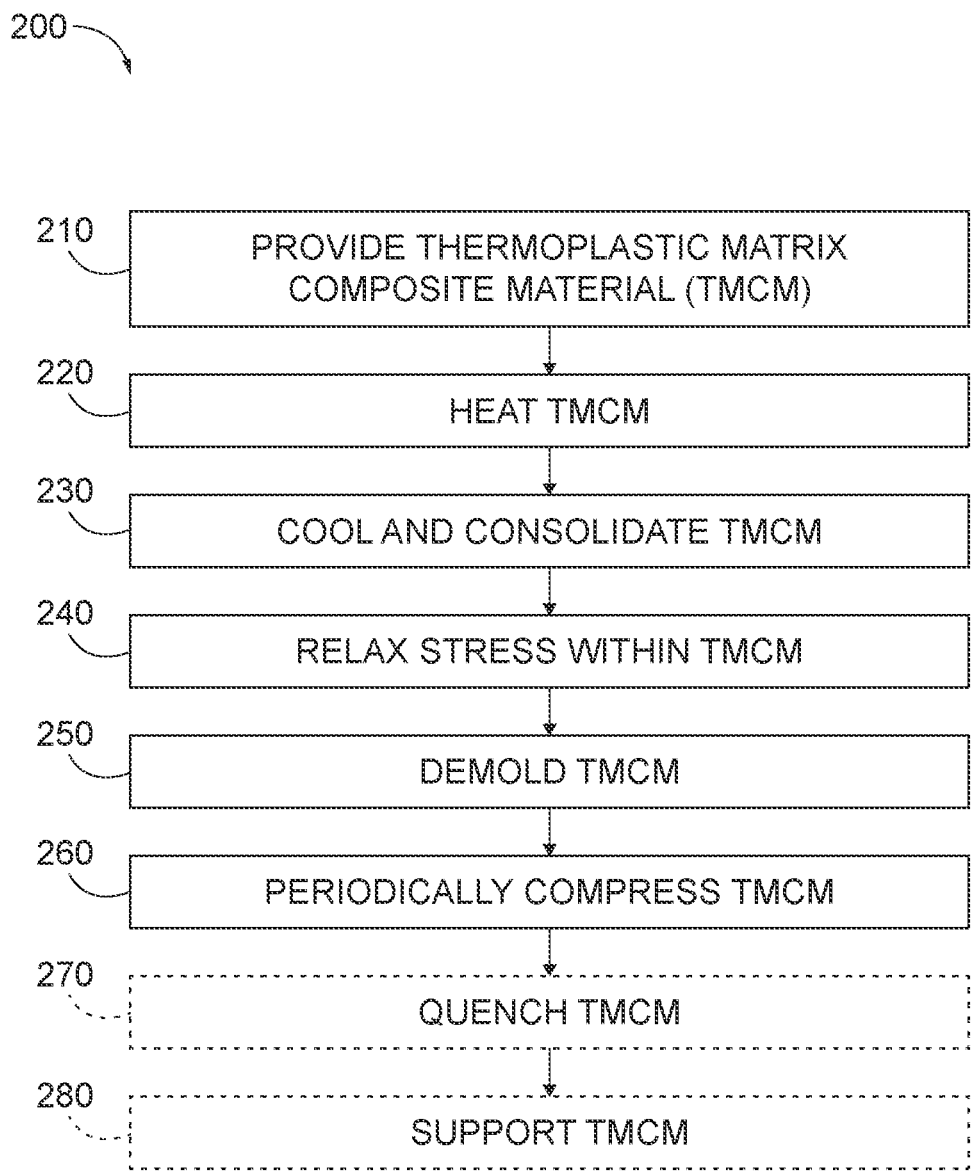
FIG. 3 is a flowchart depicting examples of methods of continuous compression molding a consolidated thermoplastic matrix composite material, according to the present disclosure.

During operation of CCMMs 10, and as discussed in more detail herein with reference to methods 200 of FIG. 3, supply structure 20 is configured to periodically advance a thermoplastic matrix composite material (TMCM) 21, such as in the form of a plurality of unconsolidated layers of TMCM 26, through mold 30. Mold 30 is adapted, configured, sized, and/or shaped to shape TMCM 21 to a desired shape for a consolidated TMCM 28. TMCM 21 includes a thermoplastic material 22 and may include a plurality of reinforcing fibers 24.

Concurrently, press structure 50 periodically compresses TMCM 21 within mold 30. In some examples, and as illustrated in FIG. 1, this periodic compression is via compression of TMCM 21 between a first mold surface 34, which is defined by a first mold die 32 of mold 30, and a second mold surface 38, which is defined by a second mold die 36 of mold 30. In some such examples, and as illustrated in FIG. 2, press structure 50 also is configured to move first mold surface 34 and second mold surface 38 away from one another to permit and/or facilitate the periodic advance of TMCM 21 through mold 30 by supply structure 20. Stated differently, periodic compression of TMCM 21 may be performed while first mold die 32 and second mold die 36 are relatively proximate one another, as illustrated in FIG. 1, while periodic advancement of TMCM 21 may be performed while first mold die 32 and second mold die 36 are relatively spaced-apart from one another, as illustrated in FIG. 2.

Also concurrently, demold structure 60 is configured to demold TMCM 21 from mold 30. This includes demolding the TMCM 21 while the TMCM is at a demold temperature that is greater than a glass transition temperature of the thermoplastic material. This is illustrated in the temperature profile of FIG. 4, where temperature, T, of the TMCM 21 is at a demold temperature, $T_d$, that is greater than the glass transition temperature, $T_g$, of the thermoplastic material upon demolding the TMCM 21 within demold zone 18.

Heating structure 40 includes a heat zone heating structure 42 configured to heat a heat zone 12 of mold 30, a consolidation zone heating structure 44 configured to heat a consolidation zone 14 of mold 30, and a stress relaxation zone heating structure 46 configured to heat a stress relaxation zone 16 of mold 30. With this in mind, press structure 50 also may be referred to herein as being configured to periodically compress TMCM 21 within heat zone 12, within consolidation zone 14, and within stress relaxation zone 16, such as to form TMCM 21 to the desired shape and/or to define consolidated TMCM 28. Similarly, supply structure 20 also may be referred to herein as being configured to periodically advance TMCM 21 such that the TMCM extends sequentially through heat zone 12, consolidation zone 14, and stress relaxation zone 16 and/or such that the TMCM extends to demold structure 60.

As illustrated in FIGS. 1-2, heating structure 40 may include, or may be referred to as including corresponding upper and lower heat zone heating structures 42, consolidation zone heating structures 44, and/or stress relaxation zone heating structures 46. In such a configuration, upper heat zone heating structure 42, upper consolidation zone heating structure 44, and upper stress relaxation zone heating structure 46 may be configured to heat first mold die 32, while lower heat zone heating structure 42, lower consolidation zone heating structure 44, and lower stress relaxation zone heating structure 46 may be configured to heat second mold die 36.

Heat zone heating structure 42 is configured to heat a heat zone 12 of mold 30 to a heat zone temperature, which is selected to heat TMCM 21 to an initial temperature that is above a melt temperature for the thermoplastic material. This is illustrated in the temperature profile of FIG. 4, where temperature, T, of TMCM 21 is increased to initial temperature, $T_i$, which is greater than the met temperature, $T_m$, of the thermoplastic material within heat zone 12. In some examples, heat zone heating structure 42 also may be referred to herein as being configured to heat TMCM 21 to within a plastic phase temperature range for the thermoplastic material. Heat zone heating structure 42 may include and/or be any suitable structure that is configured to heat the heat zone 12 of mold 30 to the heat zone temperature. In some examples, heat zone 12 is an electrically heated heat zone. In such examples, heat zone heating structure 42 includes and/or is an electrical heat zone heating structure.

Consolidation zone heating structure 44 is configured to heat a consolidation zone 14 of mold 30 to a consolidation zone temperature, which is selected to cool TMCM 21 to a subsequent temperature. The subsequent temperature may be less than the initial temperature and/or may be within a rubbery temperature range for the thermoplastic material. This is illustrated in the temperature profile of FIG. 4, where temperature, T, of TMCM 21 is decreased to subsequent temperature, $T_s$, which is less than initial temperature, $T_i$, within consolidation zone 14. Consolidation zone heating structure 44 may include and/or be any suitable structure that is configured to heat consolidation zone 14 of mold 30 to the consolidation zone temperature. In some examples, consolidation zone 14 is an electrically heated consolidation zone. In such examples, consolidation zone heating structure 44 includes and/or is an electrical consolidation zone heating structure. It is within the scope of the present disclosure that consolidation zone 14 may maintain TMCM 21 at consolidation zone temperatures that are significantly higher when compared to conventional consolidation zones of conventional CCMMs. With this in mind, consolidation zone 14 may be free from water cooling.

Stress relaxation zone heating structure 46 is configured to maintain a stress relaxation zone 16 of mold 30 at a stress relaxation zone temperature, which is selected to maintain TMCM 21 at a stress relaxation temperature. The stress relaxation temperature may be less than the initial temperature and/or may be within the rubbery temperature range for the thermoplastic material. This is illustrated in the temperature profile of FIG. 4, where temperature, T, of TMCM 21 is maintained at stress relaxation temperature, $T_r$, within stress relaxation zone 16. Stress relaxation zone heating structure 46 may include and/or be any suitable structure that is configured to heat stress relaxation zone 16 of mold 30 to the stress relaxation zone temperature. In some examples, stress relaxation zone 16 is an electrically heated stress relaxation zone. In such examples, stress relaxation zone heating structure 46 includes and/or is an electrical stress relaxation zone heating structure. It is within the scope of the present disclosure that stress relaxation zone 16 may maintain TMCM 21 at stress relaxation zone temperatures that are significantly higher when compared to conventional stress relaxation zones of conventional CCMMs. With this in mind, stress relaxation zone 16 may be free from water cooling.

As illustrated in dashed lines in FIGS. 1-2, CCMM 10 also may include a quench structure 70. Quench structure 70, when present, is adapted, configured, designed, and/or constructed to receive TMCM 21 from demold structure 60 and/or to quench TMCM 21 to a quench temperature that is less than the stress relaxation temperature. Quench structure 70 may include and/or may be defined by any suitable structure and/or structures that may permit and/or facilitate cooling of TMCM 21 to any suitable quench temperature. In a specific example, quench structure 70 includes support structure 80, which is discussed in more detail herein and is configured to operatively support TMCM 21 during the cooling. In some such examples, the TMCM may be cooled via natural convection. In some examples, quench structure 70 may include any suitable fan, blower, cooling assembly, and/or air conditioning unit. Examples of the quench temperature include an ambient temperature of an ambient environment that surrounds the TMCM and/or to temperatures that are within a threshold temperature differential of the ambient temperature. Examples of the threshold temperature differential include temperature differentials of 2 degrees Celsius (° C.), 4° C., 6° C., 8° C., or 10° C.

As also illustrated in dashed lines in FIGS. 1-2, CCMM 10 may include support structure 80. Support structure 80, when present, is adapted, configured, designed, sized, and/or constructed to receive TMCM 21 from demold structure 60 and/or to support TMCM 21, such as while the TMCM cools from the demold temperature and/or to the quench temperature. Examples of support structure 80 include any suitable mechanical support, surface, tabletop, benchtop, conveyor, and/or inner mold line support that physically and/or operatively supports TMCM 21, in the form of consolidated TMCM 28, against gravity. In a specific example, a lower surface of consolidated TMCM 28 has and/or defines a lower surface shape, which corresponds to the desired shape for the lower surface of the consolidated TMCM. In some such examples, an upper surface of support structure 80 may correspond to the lower surface shape of consolidated TMCM 28. Stated differently, the upper surface of support structure 80 may include and/or be a tooled surface that is shaped to correspond to the shape of the lower surface of consolidated TMCM 28. Such a configuration may decrease a potential for deformation of consolidated TMCM 28 upon cooling of the consolidated TMCM from the demold temperature and/or to the quench temperature.

As also illustrated in dashed lines in FIGS. 1-2, CCMM 10 may include a controller 90. Controller 90, when present, is adapted, configured, and/or programmed to control the operation of at least one other component of CCMM 10. As examples and as indicated by the dashed arrows in FIGS. 1-2, controller 90 may be programmed to control the operation of supply structure 20, heating structure 40, press structure 50, demold structure 60, and/or quench structure 70. In a specific example, controller 90 is programmed to control the operation of CCMM 10 according to methods 200 of FIG. 3, which are discussed in more detail herein. This may include control of any suitable structure of CCMM 10 disclosed herein with reference to methods 200 and/or directing CCMM 10 to perform any suitable function disclosed herein with reference to methods 200.

Controller 90 may include and/or be any suitable structure, device, and/or devices that may be adapted, configured, designed, constructed, and/or programmed to perform the functions discussed herein. As examples, controller 90 may include one or more of an electronic controller, a dedicated controller, a special-purpose controller, a personal computer, a special-purpose computer, a display device, a logic device, a memory device, and/or a memory device having computer-readable storage media.

The computer-readable storage media, when present, also may be referred to herein as non-transitory computer readable storage media. This non-transitory computer readable storage media may include, define, house, and/or store computer-executable instructions, programs, and/or code; and these computer-executable instructions may direct CCMM 10 and/or controller 90 thereof to perform any suitable portion, or subset, of methods 200. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

Figure 4:
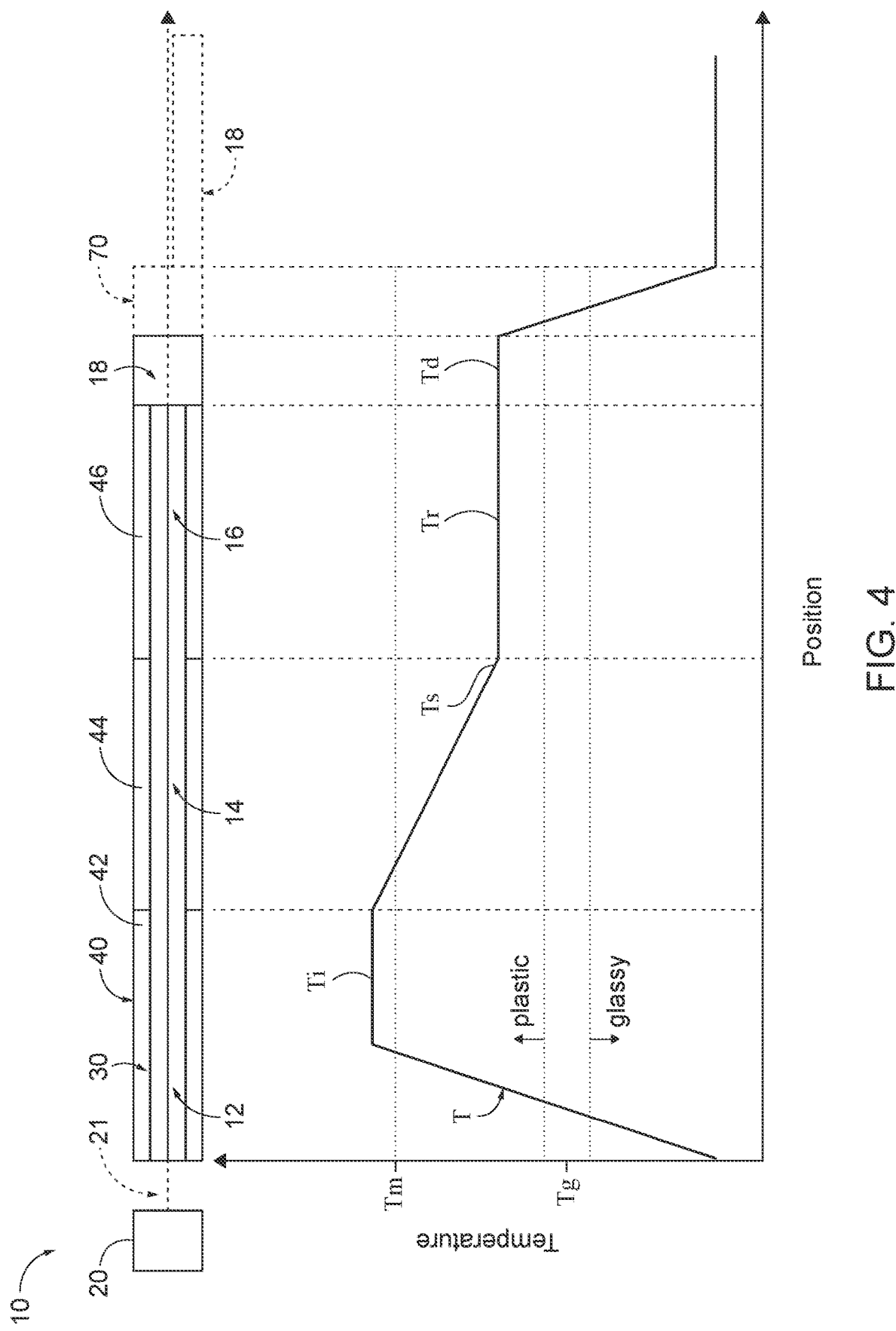
FIG. 4 is a schematic illustration of an example of a temperature profile utilized within a continuous compression molding machine, according to the present disclosure.

As discussed, mold 30 includes a plurality of zones, including heat zone 12, consolidation zone 14, and stress relaxation zone 16. As also discussed, these zones each may be heated to corresponding and/or different temperatures, with these temperatures being selected to provide a certain and/or specific function during forming of unconsolidated layers of TMCM 26 to consolidated TMCM 28. Because of these differing temperatures, the various zones of mold 30 may experience differing levels, or amounts, of thermal expansion. In some examples of CCMMs 10, it may be desirable to ensure that consolidation zone 14 provides a greater pressure to TMCM 21 when compared to stress relaxation zone 16. In some such examples, and to facilitate the cooling of TMCM 21 within consolidation zone 14 that is illustrated in FIG. 4, the consolidation zone temperature is less than the stress relaxation zone temperature. In some such examples, stress relaxation zone 16 defines a stress relaxation zone thickness that is less than a consolidation zone thickness of consolidation zone 14. Such a configuration may decrease a potential for thermal expansion effects to cause stress relaxation zone 16 to apply a greater pressure to TMCM 21 when compared to consolidation zone 14.

Mold 30 may include, or may be referred to herein as including, a plurality of mold die regions 31. In some such examples, heat zone 12, consolidation zone 14, and stress relaxation zone 16 each may be defined by at least one corresponding mold die region of the plurality of mold die regions 31. Examples of the plurality of mold die regions 31 include at least 3 mold die regions, at least 4 mold die regions, at least 5 mold die regions, at least 6 mold die regions, at most 10 mold die regions, at most 9 mold die regions, at most 8 mold die regions, at most 7 mold die regions, at most 6 mold die regions, and/or at most 5 mold die regions.

In a specific example, heat zone 12 includes a pair of mold die regions 31, each of which is maintained at a single fixed, or at least substantially fixed, heat zone temperature. In another specific example, consolidation zone 14 includes a pair of mold die regions 31 that are maintained at different consolidation zone temperatures. As yet another specific example, stress relaxation zone 16 includes a pair of mold die regions that are maintained at a single fixed, or at least substantially fixed, stress relaxation zone temperature.

Mold die regions 31, when present, may have and/or define any suitable region length. Examples of the region length include region lengths of at least 0.05 meters (m), at least 0.1 m, at least 0.15 m, at least 0.2 m, at least 0.25 m, at most 0.5 m, at most 0.45 m, at most 0.4 m, at most 0.35 m, at most 0.3 m, at most 0.25 m, and/or at most 0.2 m.

As illustrated in FIGS. 1-2, and in some examples, mold 30 defines an elongate mold channel 39. Elongate mold channel 39, when present, extends between an entrance region 92 of mold 30, which is configured to receive TMCM 21 as unconsolidated layers of TMCM 26, and an exit region 94 of mold 30, which is configured to discharge TMCM 21 as consolidated TMCM 28. Elongate mold channel 39 defines, or is shaped to define, a desired shape for consolidated TMCM 28. In some examples, and as discussed herein, mold 30 includes first mold die 32, which defines first mold surface 34, and second mold die 36, which defines second mold surface 38. In some such examples, first mold surface 34 extends parallel, or at least substantially parallel, to a first mold surface plane along an entirety of a length of elongate mold channel 39. Similarly, and in some such examples, second mold surface 38 extends parallel, or at least substantially parallel, to a second mold surface plane along an entirety of a length of elongate mold channel 39. In some such examples, a distance between first mold surface 34 and second mold surface 38 decreases, or decreases monotonically, along the length of elongate mold channel 39 and between entrance region 92 and exit region 94 (or between heat zone 12 and stress relaxation zone 16). Stated differently, and in some examples, mold 30 is free of shape composition for consolidated TMCM 28. This is in contrast to conventional CCMMs, which demold corresponding TMCMs at conventional demold temperatures that are significantly lower than the demold temperatures utilized in CCMMs 10, that require correspondingly utilized molds to include shape compensation in order to form the corresponding TMCMs into the corresponding desired shape.

In some examples, entrance region 92 and/or exit region 94 include corresponding curved, chamfered, and/or tapered relief regions. These relief regions, when present, are configured to facilitate entrance of TMCM 21 into mold 30 at entrance region 92 and/or to facilitate demolding of TMCM 21 from mold 30 at exit region 94. In such examples, the above-discussed first mold surface 34 and/or second mold surface 38 are defined by regions of mold 30 that are outside, or that extend between, these relief regions.

TMCM 21 may include and/or may be defined by any suitable material and/or materials. As discussed, TMCM 21 includes thermoplastic material 22. Examples of thermoplastic material 22 include an amorphous thermoplastic material, a semicrystalline thermoplastic material, a polyphenylene sulfide (PPS) thermoplastic material, a polyether ether ketone (PEEK) thermoplastic material, a polyetherketoneketone (PEKK) thermoplastic material, and a polyaryletherketone (PAEK) thermoplastic material. As also discussed, TMCM 21 may include a plurality of reinforcing fibers 24. Examples of reinforcing fibers 24 include a carbon fiber, a fiberglass fiber, and an aramid fiber.

Supply structure 20 may include any suitable component and/or components that may be adapted, configured, designed, and/or constructed to provide TMCM 21 and/or to periodically advance TMCM 21 through mold 30. Examples of supply structure 20 include a source of TMCM 21, a supply of TMCM 21, a roller, a conveyor, a feeder, a motor, and/or an electric motor.

Press structure 50 may include any suitable component and/or components that may be adapted, configured, designed, and/or constructed to periodically compress TMCM 21 within mold 30. Examples of press structure 50 include a hydraulic press, a hydraulically actuated press, an electric press, an electrically actuated press, and/or an electric over hydraulic press.

Demold structure 60 may include any suitable component and/or components that may be adapted, configured, designed, and/or constructed to demold, or to separate, TMCM 21 from mold 30 while the TMCM is at the demold temperature. Examples of demold structure 60 include a region of mold 30 that tapers and/or expands away from TMCM 21, a mechanism that physically separates the TMCM from the mold, and/or a structure that supports the TMCM subsequent to the TMCM exiting the mold, such as support structure 80.

FIG. 3 is a flowchart depicting examples of methods 200 of continuous compression molding a consolidated thermoplastic matrix composite material, according to the present disclosure. Methods 200 may be performed utilizing a continuous compression molding machine, such as CCMMs 10 of FIGS. 1-2. With this in mind, any of the structures, functions, and/or features, which are disclosed herein with reference to CCMMs 10 of FIGS. 1-2 may be included in and/or utilized with methods 200 of FIG. 3 without departing from the scope of the present disclosure. Similarly, any of the structures, functions, and/or features, which are disclosed herein with reference to methods 200 of FIG. 3, may be included in and/or utilized with CCMMs 10 of FIGS. 1-2 without departing from the scope of the present disclosure.

As illustrated in FIG. 3, methods 200 include providing a thermoplastic matrix composite material (TMCM) at 210, heating the TMCM at 220, and cooling and consolidating the TMCM at 230. Methods 200 also include relaxing stress within the TMCM at 240, demolding the TMCM at 250, and periodically compressing the TMCM at 260. Methods 200 further may include quenching the TMCM at 270 and/or supporting the TMCM at 280.

Providing the thermoplastic matrix composite material (TMCM) at 210 includes providing any suitable TMCM, which includes a thermoplastic material, to a continuous compression molding machine. Examples of the TMCM are disclosed herein with reference to TMCM 21 of FIGS. 1-2. Examples of the continuous compression molding machine are disclosed herein with reference to CCMM 10 of FIGS. 1-2. The providing at 210 may be performed utilizing any suitable structure, such as supply structure 20 of FIGS. 1-2.

In some examples, the providing at 210 includes providing the TMCM at a linear feed rate, or at an average linear feed rate. The linear feed rate may be selected and/or established based upon material properties of the TMCM and/or a desired production rate of consolidated TMCM 28 from the CCMM. Examples of the linear feed rate include linear feed rates of at least 2 meters per hour (m/h), at least 2.5 m/h, at least 3 m/h, at least 3.5 m/h, at least 4 m/h, at least 4.5 m/h, at least 5 m/h, at least 6 m/h, at least 7 m/h, at least 8 m/h, at least 9 m/h, at least 10 m/h, at least 12 m/h, at least 14 m/h, at most 20 m/h, at most 18 m/h, at most 16 m/h, at most 14 m/h, at most 12 m/h, at most 10 m/h, at most 8 m/h, at most 6 m/h, and/or at most 4 m/h.

Heating the TMCM at 220 includes heating the TMCM during the providing at 210. This includes heating the TMCM within a heat zone of the CCMM, to an initial temperature, and/or to within an initial temperature range. The initial temperature and/or the initial temperature range is above a melt temperature of the thermoplastic material. Examples of the heat zone are disclosed herein with reference to heat zone 12 of FIGS. 1-2.

The initial temperature may be selected and/or established based upon material properties for the TMCM, desired material properties for the consolidated TMCM, and/or the desired production rate of the consolidated TMCM from the CCMM. Examples of the initial temperature include initial temperatures of at least 300 degrees Celsius (° C.), at least 310° C., at least 320° C., at least 330° C., at least 340° C., at least 350° C., at least 360° C., at least 370° C., at least 380° C., at least 390° C., at least 400° C., at most 450° C., at most 440° C., at most 430° C., at most 420° C., at most 410° C., at most 400° C., at most 390° C., at most 380° C., at most 370° C., at most 360° C., and/or at most 350° C.

Cooling and consolidating the TMCM at 230 includes cooling and consolidating the TMCM during the providing at 210. This includes cooling and consolidating the TMCM within a consolidation zone of the CCMM, to a subsequent temperature, and/or to within a subsequent temperature range. In some examples, the subsequent temperature and/or the subsequent temperature range is less than the initial temperature and/or is within a rubbery temperature range of the thermoplastic material. Examples of the consolidation zone are disclosed herein with reference to consolidation zone 14 of FIGS. 1-2.

The subsequent temperature may be selected and/or established based upon material properties for the TMCM, desired material properties for the consolidated TMCM, and/or the desired production rate of the consolidated TMCM from the CCMM. Examples of the subsequent temperature include subsequent temperatures at least 200° C., at least 210° C., at least 220° C., at least 230° C., at least 240° C., at least 250° C., at least 260° C., at least 270° C., at least 280° C., at least 290° C., at least 300° C., at most 350° C., at most 340° C., at most 330° C., at most 320° C., at most 310° C., at most 300° C., at most 290° C., at most 280° C., at most 270° C., at most 260° C., and/or at most 250° C.

Relaxing stress within the TMCM at 240 includes relaxing stress within the TMCM during the providing at 210. This includes relaxing stress within a stress relaxation zone of the CCMM, to a stress relaxation temperature, and/or to within a stress relaxation temperature range. In some examples, the stress relaxation temperature and/or the stress relaxation temperature range is less than the initial temperature and/or within the rubbery temperature range of the thermoplastic material. Examples of the stress relaxation zone are disclosed herein with reference to stress relaxation zone 16 of FIGS. 1-2.

In some examples, the stress relaxation temperature is a stress-free temperature for the thermoplastic material. The stress-free temperature may be selected such that a relaxation time constant for the thermoplastic material is less than a process time for the TMCM within the CCMM. In some such examples, the relaxation time constant for the thermoplastic material is less than 90%, less than 80%, less than 70%, less than 60%, less than 50%, less than 40%, less than 30%, or less than 20% of the process time for the TMCM within the CCMM. The process time for the TMCM may be a time period that begins when a given region of the TMCM enters the heat zone and ends when the given region of the TMCM exits the stress relaxation zone. Stated differently, the stress-free temperature may be selected such that stresses within the thermoplastic material are completely relaxed, or at least substantially completely relaxed, when the consolidated TMCM exits the stress relaxation zone.

The stress relaxation temperature additionally or alternatively may be selected and/or established based upon material properties for the TMCM, desired material properties for the consolidated TMCM, and/or the desired production rate of the consolidated TMCM from the CCMM. Examples of the stress relaxation temperature include stress relaxation temperatures of at least 200° C., at least 210° C., at least 220° C., at least 230° C., at least 240° C., at least 250° C., at least 260° C., at least 270° C., at least 280° C., at least 290° C., at least 300° C., at most 350° C., at most 340° C., at most 330° C., at most 320° C., at most 310° C., at most 300° C., at most 290° C., at most 280° C., at most 270° C., at most 260° C., and/or at most 250° C.

As discussed, the stress relaxation temperature is less than the initial temperature. It is within the scope of the present disclosure that the stress relaxation temperature may differ from the initial temperature by any suitable magnitude. As examples, a difference between the initial temperature and the stress relaxation temperature may be at least 20° C., at least 25° C., at least 30° C., at least 35° C., at least 40° C., at least 45° C., at least 50° C., at least 55° C., at least 60° C., at least 65° C., at least 70° C., at least 75° C., at least 80° C., at least 85° C., at least 90° C., at most 200° C., at most 190° C., at most 180° C., at most 170° C., at most 160° C., at most 150° C., at most 140° C., at most 130° C., at most 120° C., at most 110° C., at most 100° C., at most 90° C., at most 80° C., at most 70° C., at most 60° C., at most 50° C., at most 40° C., and/or at most 30° C.

In general, methods 200 are performed during a finite timeframe within which kinetic effects cause the temperature of the TMCM to differ from the temperature of the various zones of the CCMM that are heating and/or cooling the TMCM. With this in mind, and in some examples, the heat zone has a heat zone temperature, the consolidation zone has a consolidation zone temperature, and the stress relaxation zone has a stress relaxation zone temperature. In such examples, the heat zone temperature is at least the initial temperature and is selected to heat the TMCM to the initial temperature, the consolidation zone temperature is at most the subsequent temperature and is selected to cool the TMCM to the subsequent temperature, the stress relaxation zone temperature, which is at most the consolidation zone temperature and is selected to maintain the TMCM at the stress relaxation temperature. In some such examples, the consolidation zone temperature is less than the stress relaxation zone temperature. Stated differently, and in such examples, the consolidation zone temperature is at least a threshold consolidation zone temperature differential less than the stress relaxation zone temperature. Examples of the threshold consolidation zone temperature differential include temperature differentials of at least 10° C., at least 15° C., at least 20° C., at least 25° C., at least 30° C., at least 35° C., at least 40° C., at least 45° C., at least 50° C., at least 60° C., at least 70° C., at most 100° C., at most 90° C., at most 80° C., at most 70° C., at most 60° C., at most 50° C., and/or at most 40° C.

Demolding the TMCM at 250 includes demolding the TMCM during the providing at 210. The demolding at 250 also includes demolding the TMCM from a mold 30 of the CCMM, within a demold zone 18 of the CCMM, at a demold temperature, and/or within a demold temperature range. The demold temperature and/or the demold temperature range is greater than a glass transition temperature of the thermoplastic material. In some examples, the demolding at 250 include demolding with, via, and/or utilizing a demold structure, examples of which are disclosed herein with reference to demold structure 60 of FIGS. 1-2.

As illustrated in FIGS. 1-2, methods 200 may be performed as part of a continuous process within which the TMCM extends within and/or through the heat zone, the consolidation zone, the stress relaxation zone, and the demold zone of the CCMM. With this in mind, the heating at 220 also may be referred to herein as heating a region of the TMCM, or a region of a continuous length of the TMCM, that extends within the heat zone of the CCMM; and the cooling and consolidating at 230 also may be referred to herein as cooling and consolidating a region of the TMCM, or a region of the continuous length of the TMCM, that extends within the consolidation zone of the CCMM. Similarly, the relaxing at 240 also may be referred to herein as relaxing stress within a region of the TMCM, or a region of the continuous length of the TMCM, that extends within the stress relaxation zone of the CCMM; and the demolding at 250 also may be referred to herein as demolding a region of the TMCM, or a region of the continuous length of the TMCM, that extends within the demold zone of the CCMM.

Stated differently, the providing at 210 may include periodically advancing a continuous length of the TMCM sequentially through the heat zone, the consolidation zone, the stress relaxation zone, and the demold zone. This may include periodically advancing a predetermined length of the TMCM into the heat zone. Examples of the predetermined length of the TMCM include lengths of at least 10 millimeters (mm), at least 15 mm, at least 20 mm, at least 25 mm, at least 30 mm, at least 35 mm, at least 40 mm, at least 45 mm, at least 50 mm, at least 55 mm, at least 60 mm, at most 100 mm, at most 90 mm, at most 80 mm, at most 70 mm, at most 60 mm, at most 50 mm, at most 40 mm, at most 30 mm, and/or at most 20 mm.

Periodically compressing the TMCM at 260 includes periodically compressing the TMCM during the providing at 210. The periodically compressing at 260 also includes periodically compressing the TMCM within the mold of the CCMM and/or to form the TMCM to a desired shape for the consolidated TMCM. In some examples, the periodically compressing at 260 includes periodically compressing via a press structure, examples of which are disclosed herein with reference to press structure 50 of FIGS. 1-2.

As discussed in more detail herein, the mold may include a first mold die, which defines a first mold surface, and a second mold die, which defines a second mold surface. Examples of the first mold die, the first mold surface, the second mold die, and the second mold surface are disclosed herein with reference to first mold die 32, first mold surface 34, second mold die 36, and second mold surface 38, respectively, of FIGS. 1-2. In such examples, the first mold surface faces toward the second mold surface, such as to define an elongate mold channel, examples of which are disclosed herein with reference to elongate mold channel 39 of FIGS. 1-2. In some such examples, methods 200 include moving the first mold surface away from the second mold surface, such as to the configuration that is illustrated in FIG. 2, to permit and/or facilitate the periodically advancing of the continuous length of the TMCM through the mold. Also in some such examples, methods 200 include moving the first mold surface toward and/or into contact with the second mold surface, such as to the configuration that is illustrated in FIG. 1, to permit and/or facilitate compression of the TMCM by the mold during the periodically compressing at 260.

Quenching the TMCM at 270, when performed, includes quenching the TMCM to a quench temperature and is performed subsequent to the demolding at 250. The quench temperature is less than the stress relaxation temperature. In some examples, the quench temperature is a threshold quench temperature differential less than the stress relaxation temperature. Examples of the threshold quench temperature differential include temperature differentials of at least 50° C., at least 60° C., at least 70° C., at least 80° C., at least 90° C., at least 100° C., at least 110° C., at least 120° C., at least 130° C., at least 140° C., at least 150° C., at least 160° C., at least 170° C., at least 180° C., at least 190° C., at least 200° C., at most 350° C., at most 340° C., at most 330° C., at most 320° C., at most 310° C., at most 300° C., at most 290° C., at most 280° C., at most 270° C., at most 260° C., at most 250° C., at most 240° C., at most 230° C., at most 220° C., at most 210° C., at most 200° C., at most 190° C., at most 180° C., at most 170° C., at most 160° C., at most 150° C., at most 140° C., at most 130° C., at most 120° C., at most 110° C., and/or at most 100° C.

The quenching at 270 may be performed in any suitable manner and/or utilizing any suitable structure, such as quench structure 70 of FIGS. 1-2. In a specific example, the quenching at 270 includes quenching to an ambient temperature of an ambient environment that surrounds the TMCM and/or to temperatures that are within a threshold temperature differential of the ambient temperature. In some such examples, the quenching at 270 includes quenching via natural convection.

Supporting the TMCM at 280, when performed, includes supporting the TMCM subsequent to the demolding at 250 and/or with a support structure. Examples of the support structure are disclosed herein with reference to support structure 80 of FIGS. 1-2. In some examples, the supporting at 280 includes supporting a lower surface, or only a lower surface, of the TMCM. In some examples, the supporting at 280 includes maintaining contact between the TMCM and the support structure via, or only via, a gravitational force that acts on the TMCM. In some examples, the support structure is a stationary, or at least substantially stationary, support structure. In some examples, the TMCM is free from compression, by the support structure, during the supporting at 280.

It is within the scope of the present disclosure that CCMMs 10 may form and/or methods 200 may be performed utilizing a variety of different TMCMs, including the TMCMs 21 that are disclosed herein. In some examples, the TMCMs are categorized as including either semicrystalline thermoplastic material or amorphous thermoplastic material.

In a specific example, the TMCMs include thermoplastic materials in the form of the semicrystalline thermoplastic material. In some such examples, the subsequent temperature is below the melt temperature of the semicrystalline thermoplastic material and above the glass transition temperature of the semicrystalline thermoplastic material. Also in some such examples, the stress relaxation temperature is below the melt temperature of the semicrystalline thermoplastic material and above the glass transition temperature of the semicrystalline thermoplastic material.

In some examples, the stress relaxation temperature is selected to provide at least a threshold relative crystallinity for the semicrystalline thermoplastic material within the consolidated TMCM 28. Stated differently, the stress relaxation temperature is selected such that the semicrystalline thermoplastic material within the consolidated TMCM exhibits at least the threshold relative crystallinity, when compared to a maximum possible crystallinity based upon a chemical composition of the semicrystalline thermoplastic material. Examples of the threshold relative crystallinity include thresholds of at least 30%, at least 40%, at least 50%, at least 60%, or at least 70% of the maximum possible crystallinity.

In some examples, the stress relaxation temperature and/or the demold temperature are within a threshold temperature differential of a peak isothermal crystallization temperature of the semicrystalline thermoplastic material. Examples of the threshold temperature differential include differentials of 1° C., 2° C., 3° C., 4° C., 5° C., 6° C., 8° C., 10° C., 15° C., or 20° C. Such a configuration may increase the relative crystallinity of the consolidated TMCM 28 when compared to continuous compression molding processes that do not maintain the semicrystalline thermoplastic material near the peak isothermal crystallization temperature.

In some example, the stress relaxation temperature is greater than the peak isothermal crystallization temperature of the semicrystalline thermoplastic material. As examples, the stress relaxation temperature is at least 5° C., at least 10° C., at least 15° C., at least 20° C., at least 25° C., at least 30° C., at least 35° C., at least 40° C., at least 45° C., at most 50° C., at most 45° C., at most 40° C., at most 35° C., at most 30° C., at most 25° C., and/or at most 20° C. greater than the peak isothermal crystallization temperature of the semicrystalline thermoplastic material. In such examples, the stress relaxation temperature may be selected based upon a desired crystallization rate for the semicrystalline thermoplastic material, with higher temperature differentials providing a relatively higher crystallization rate and lower temperatures providing a relatively lower crystallization rate.

In another specific example, the TMCMs include thermoplastic materials in the form of the amorphous thermoplastic material. In some such examples, the subsequent temperature is greater than the glass transition temperature of the amorphous thermoplastic material. Additionally or alternatively, and in such examples, the stress relaxation temperature is greater than the glass transition temperature of the amorphous thermoplastic material.

Illustrative, non-exclusive examples of inventive subject matter according to the present disclosure are described in the following enumerated paragraphs:

A1. A method of continuous compression molding a consolidated thermoplastic matrix composite material, the method comprising:
providing a thermoplastic matrix composite material (TMCM), which includes a thermoplastic material, to a continuous compression molding machine (CCMM); and
during the providing:
(i) heating the TMCM, within a heat zone of the CCMM, to an initial temperature that is above a melt temperature of the thermoplastic material;
(ii) cooling and consolidating the TMCM, within a consolidation zone of the CCMM, to a subsequent temperature, optionally that is less than the initial temperature and within a rubbery temperature range of the thermoplastic material;
(iii) relaxing stress within the TMCM, within a stress relaxation zone of the CCMM, at a stress relaxation temperature, optionally that is less than the initial temperature and within the rubbery temperature range of the thermoplastic material;
(iv) demolding the TMCM from a mold of the CCMM, within a demold zone of the CCMM and at a demold temperature that is greater than a glass transition temperature of the thermoplastic material; and
(v) periodically compressing the TMCM, with the mold of the CCMM, to form the TMCM to a desired shape for the consolidated thermoplastic matrix composite material.

A2. The method of paragraph A1, wherein the thermoplastic material includes, or is, a semicrystalline thermoplastic material.

A3. The method of paragraph A2, wherein the subsequent temperature is below the melt temperature of the semicrystalline thermoplastic material and above the glass transition temperature of the semicrystalline thermoplastic material.

A4. The method of any of paragraphs A2-A3, wherein the stress relaxation temperature is below the melt temperature of the semicrystalline thermoplastic material and above the glass transition temperature of the semicrystalline thermoplastic material.

A5. The method of any of paragraphs A2-A4, wherein at least one of the stress relaxation temperature and the demold temperature is within a threshold temperature differential of a peak isothermal crystallization temperature of the semicrystalline thermoplastic material.

A6. The method of paragraph A5, wherein the threshold temperature differential is 1 degree Celsius (° C.), 2° C., 3° C., 4° C., 5° C., 6° C., 8° C., 10° C., 15° C., or 20° C.

A7. The method of any of paragraphs A2-A6, wherein the stress relaxation temperature is at least one of at least 5° C., at least 10° C., at least 15° C., at least 20° C., at least 25° C., at least 30° C., at least 35° C., at least 40° C., at least 45° C., at most 50° C., at most 45° C., at most 40° C., at most 35° C., at most 30° C., at most 25° C., or at most 20° C. greater than a/the peak isothermal crystallization temperature of the semicrystalline thermoplastic material.

A8. The method of paragraph A1, wherein the thermoplastic material includes, or is, an amorphous thermoplastic material.

A9. The method of paragraph A8, wherein the initial temperature is greater than a glass transition temperature of the amorphous thermoplastic material.

A10. The method of any of paragraphs A8-A9, wherein the subsequent temperature is greater than a/the glass transition temperature of the amorphous thermoplastic material.

A11. The method of any of paragraphs A8-A10, wherein the stress relaxation temperature is greater than a/the glass transition temperature of the amorphous thermoplastic material.

A12. The method of any of paragraphs A1-A11, wherein the initial temperature is at least one of:
(i) at least 300° C., at least 310° C., at least 320° C., at least 330° C., at least 340° C., at least 350° C., at least 360° C., at least 370° C., at least 380° C., at least 390° C., or at least 400° C.; and (ii) at most 450° C., at most 440° C., at most 430° C., at most 420° C., at most 410° C., at most 400° C., at most 390° C., at most 380° C., at most 370° C., at most 360° C., or at most 350° C.

A13. The method of any of paragraphs A1-A12, wherein the subsequent temperature is at least one of:
(i) at least 200° C., at least 210° C., at least 220° C., at least 230° C., at least 240° C., at least 250° C., at least 260° C., at least 270° C., at least 280° C., at least 290° C., or at least 300° C.; and
(ii) at most 350° C., at most 340° C., at most 330° C., at most 320° C., at most 310° C., at most 300° C., at most 290° C., at most 280° C., at most 270° C., at most 260° C., or at most 250° C.

A14. The method of any of paragraphs A1-A13, wherein the stress relaxation temperature is a stress-free temperature for the thermoplastic material at which a relaxation time constant for the thermoplastic material is less than a process time for the TMCM within the CCMM.

A15. The method of paragraph A14, wherein the relaxation time constant is less than 90%, less than 80%, less than 70%, less than 60%, less than 50%, less than 40%, less than 30%, or less than 20% of the process time for the TMCM within the CCMM.

A16. The method of any of paragraphs A1-A15, wherein the stress relaxation temperature is at least one of:
(i) at least 200° C., at least 210° C., at least 220° C., at least 230° C., at least 240° C., at least 250° C., at least 260° C., at least 270° C., at least 280° C., at least 290° C., or at least 300° C.; and
(ii) at most 350° C., at most 340° C., at most 330° C., at most 320° C., at most 310° C., at most 300° C., at most 290° C., at most 280° C., at most 270° C., at most 260° C., or at most 250° C.

A17. The method of any of paragraphs A1-A16, wherein a difference between the initial temperature and the stress relaxation temperature is at least one of:
(i) at least 20° C., at least 25° C., at least 30° C., at least 35° C., at least 40° C., at least 45° C., at least 50° C., at least 55° C., at least 60° C., at least 65° C., at least 70° C., at least 75° C., at least 80° C., at least 85° C., at least 90° C.; and
(ii) at most 200° C., at most 190° C., at most 180° C., at most 170° C., at most 160° C., at most 150° C., at most 140° C., at most 130° C., at most 120° C., at most 110° C., at most 100° C., at most 90° C., at most 80° C., at most 70° C., at most 60° C., at most 50° C., at most 40° C., or at most 30° C.

A18. The method of any of paragraphs A1-A17, wherein:
(i) the heat zone has a heat zone temperature, which is at least the initial temperature and is selected to heat the TMCM to the initial temperature;
(ii) the consolidation zone has a consolidation zone temperature, which is at most the subsequent temperature and is selected to cool the TMCM to the subsequent temperature; and
(iii) the stress relaxation zone has a stress relaxation zone temperature, which is at most the consolidation zone temperature and is selected to maintain the TMCM at the stress relaxation temperature.

A19. The method of paragraph A18, wherein the consolidation zone temperature is less than the stress relaxation zone temperature.

A20. The method of any of paragraphs A18-A19, wherein the consolidation zone temperature is at least a threshold consolidation zone temperature differential less than the stress relaxation zone temperature, optionally wherein the threshold consolidation zone temperature differential is at least one of:
(i) at least 10° C., at least 15° C., at least 20° C., at least 25° C., at least 30° C., at least 35° C., at least 40° C., at least 45° C., at least 50° C., at least 60° C., or at least 70° C.; and
(ii) at most 100° C., at most 90° C., at most 80° C., at most 70° C., at most 60° C., at most 50° C., or at most 40° C.

A21. The method of any of paragraphs A1-A20, wherein the providing includes periodically advancing a continuous length of the TMCM sequentially through the heat zone, the consolidation zone, the stress relaxation zone, and the demold zone, optionally wherein the mold includes a first mold die, which defines a first mold surface, and a second mold die, which defines a second mold surface that faces toward the first mold surface, and optionally wherein the method includes:
(i) moving the first mold surface away from the second mold surface to permit the periodically advancing; and
(ii) moving the first mold surface toward the second mold surface during the periodically compressing.

A22. The method of paragraph A21, wherein the mold defines an elongate mold channel that defines the desired shape for the consolidated thermoplastic matrix composite material.

A23. The method of paragraph A22, wherein the first mold surface extends parallel, or at least substantially parallel, to a first mold surface plane along an entirety of a length of the elongate mold channel.

A24. The method of any of paragraphs A22-A23, wherein the second mold surface extends parallel, or at least substantially parallel, to a second mold surface plane along an/the entirety of a/the length of the elongate mold channel.

A25. The method of paragraph A24, wherein a distance between the first mold surface and the second mold surface decreases along the length of the elongate mold channel and from the heat zone to the stress relaxation zone.

A26. The method of any of paragraphs A21-A25, wherein the periodically advancing includes periodically advancing a predetermined length of the TMCM into the heat zone, optionally wherein the predetermined length of the TMCM is at least one of:
(i) at least 10 millimeters (mm), at least 15 mm, at least 20 mm, at least 25 mm, at least 30 mm, at least 35 mm, at least 40 mm, at least 45 mm, at least 50 mm, at least 55 mm, or at least 60 mm; and
(ii) at most 100 mm, at most 90 mm, at most 80 mm, at most 70 mm, at most 60 mm, at most 50 mm, at most 40 mm, at most 30 mm, or at most 20 mm.

A27. The method of any of paragraphs A1-A26, wherein the mold is free of shape compensation for the consolidated TMCM.

A28. The method of any of paragraphs A1-A27, wherein the providing the TMCM includes providing the TMCM at a linear feed rate, optionally wherein the linear feed rate is at least one of:
(i) at least 2 meters per hour (m/h), at least 2.5 m/h, at least 3 m/h, at least 3.5 m/h, at least 4 m/h, at least 4.5 m/h, at least 5 m/h, at least 6 m/h, at least 7 m/h, at least 8 m/h, at least 9 m/h, at least 10 m/h, at least 12 m/h, or at least 14 m/h; and (ii) at most 20 m/h, at most 18 m/h, at most 16 m/h, at most 14 m/h, at most 12 m/h, at most 10 m/h, at most 8 m/h, at most 6 m/h, or at most 4 m/h.

A29. The method of any of paragraphs A1-A28, wherein a/the continuous length of the TMCM extends through the heat zone, the consolidation zone, and the stress relaxation zone.

A30. The method of any of paragraphs A1-A29, wherein the thermoplastic material includes at least one of:
(i) an/the amorphous thermoplastic material;
(ii) a/the semicrystalline thermoplastic material;
(iii) a polyphenylene sulfide (PPS) thermoplastic material;
(iv) a polyether ether ketone (PEEK) thermoplastic material;
(v) a polyetherketoneketone (PEKK) thermoplastic material; and
(vi) a polyaryletherketone (PAEK) thermoplastic material.

A31. The method of any of paragraphs A1-A30, wherein the TMCM further includes a reinforcing fiber, optionally wherein the reinforcing fiber includes at least one of:
(i) a carbon fiber;
(ii) a fiberglass fiber; and
(iii) an aramid fiber.

A32. The method of any of paragraphs A1-A31, wherein the mold includes a plurality of mold die regions, and further wherein the heat zone, the consolidation zone, and the stress relaxation zone each are defined by at least one corresponding mold die region of the plurality of mold die sections.

A33. The method of paragraph A32, wherein the plurality of mold die region includes at least one of:
(i) at least 3 mold die regions, at least 4 mold die regions, at least 5 mold die regions, or at least 6 mold die regions; and
(ii) at most 10 mold die regions, at most 9 mold die regions, at most 8 mold die regions, at most 7 mold die regions, at most 6 mold die regions, or at most 5 mold die regions.

A34. The method of any of paragraphs A32-A33, wherein the at least one mold die region that defines the heat zone includes at least 2 mold die region that are maintained at a single fixed, or at least substantially fixed, heat zone temperature.

A35. The method of any of paragraphs A32-A34, wherein the at least one mold die region that defines the consolidation zone includes at least 2 mold die region that are maintained at different consolidation zone temperatures.

A36. The method of any of paragraphs A32-A35, wherein the at least one mold die region that defines the stress relaxation zone includes at least 2 mold die region that are maintained at a single fixed, or at least substantially fixed, stress relaxation zone temperature.

A37. The method of any of paragraphs A32-A36, wherein each mold die region of the plurality of mold die region defines a corresponding region length, optionally wherein the corresponding region length is at least one of:
(i) at least 0.05 meters (m), at least 0.1 m, at least 0.15 m, at least 0.2 m, or at least 0.25 m; and
(ii) at most 0.5 m, at most 0.45 m, at most 0.4 m, at most 0.35 m, at most 0.3 m, at most 0.25 m, or at most 0.2 m.

A38. The method of any of paragraphs A1-A37, wherein at least one of:
(i) the heat zone is an electrically heated heat zone;
(ii) the consolidation zone is an electrically heated consolidation zone; and
(iii) the stress relaxation zone is an electrically heated stress relaxation zone.

A39. The method of any of paragraphs A1-A38, wherein at least one of:
(i) the consolidation zone is free from water cooling; and
(ii) the stress relaxation zone is free from water cooling.

A40. The method of any of paragraphs A1-A39, wherein, subsequent to the demolding, the method further includes quenching the TMCM to a quench temperature that is less than the stress relaxation temperature, optionally wherein the quench temperature is a threshold quench temperature differential less than the stress relaxation temperature, and further optionally wherein the threshold quench temperature differential is at least one of:
(i) at least 50° C., at least 60° C., at least 70° C., at least 80° C., at least 90° C., at least 100° C., at least 110° C., at least 120° C., at least 130° C., at least 140° C., at least 150° C., at least 160° C., at least 170° C., at least 180° C., at least 190° C., or at least 200° C.; and
(ii) at most 350° C., at most 340° C., at most 330° C., at most 320° C., at most 310° C., at most 300° C., at most 290° C., at most 280° C., at most 270° C., at most 260° C., at most 250° C., at most 240° C., at most 230° C., at most 220° C., at most 210° C., at most 200° C., at most 190° C., at most 180° C., at most 170° C., at most 160° C., at most 150° C., at most 140° C., at most 130° C., at most 120° C., at most 110° C., or at most 100° C.

A41. The method of any of paragraphs A1-A40, wherein, subsequent to the demolding, the method further includes supporting the TMCM with a support structure.

A42. The method of paragraph A41, wherein the supporting includes supporting a lower surface, or only a lower surface, of the TMCM.

A43. The method of any of paragraphs A41-A42, wherein the supporting includes maintaining contact between the TMCM and the support structure via, or only via, a gravitational force acting on the TMCM.

A44. The method of any of paragraphs A41-A43, wherein the support structure is a stationary support structure.

A45. The method of any of paragraphs A41-A44, wherein the TMCM is free from compression by the support structure during, or during an entirety of, the supporting.

B1. A continuous compression molding machine (CCMM), comprising:
a mold configured to shape a thermoplastic matrix composite material (TMCM), which includes a thermoplastic material, to a desired shape for a consolidated thermoplastic matrix composite material;
a heat zone heating structure configured to heat a heat zone of the mold to a heat zone temperature selected to heat the TMCM to an initial temperature that is above a melt temperature for the thermoplastic material;
a consolidation zone heating structure configured to heat a consolidation zone of the mold to a consolidation zone temperature selected to cool the TMCM to a subsequent temperature, optionally that is less than the initial temperature and within a rubbery temperature range for the thermoplastic material;

a stress relaxation zone heating structure configured to maintain a stress relaxation zone of the mold at a stress relaxation zone temperature selected to maintain the TMCM at a stress relaxation temperature, optionally that is less than the initial temperature and within the rubbery temperature range for the thermoplastic material;

a press structure configured to periodically compress the TMCM within the mold, and optionally also within the heat zone, the consolidation zone, and the stress relaxation zone, to form the TMCM to the desired shape;

a demold structure configured to demold the TMCM from the mold while the TMCM is at a demold temperature that is greater than a glass transition temperature of the thermoplastic material; and a supply structure configured to periodically advance the TMCM through the mold, optionally such that the TMCM extends sequentially through the heat zone, the consolidation zone, and the stress relaxation zone and to the demold structure.

B2. The CCMM of paragraph B1, wherein the CCMM further includes a quench structure configured to receive the TMCM from the demold structure and to quench the TMCM to a quench temperature that is less than the stress relaxation temperature.

B3. The CCMM of any of paragraphs B1-B2, wherein the CCMM further includes a support structure configured to receive the TMCM from the demold structure and to support the TMCM.

B4. The CCMM of any of paragraphs B1-B3, wherein the consolidation zone of the mold defines a consolidation zone thickness, wherein the stress relaxation zone of the mold defines a stress relaxation zone thickness, and further wherein the stress relaxation zone thickness is less than the consolidation zone thickness.

B5. The CCMM of any of paragraphs B1-B4, wherein the CCMM further includes a controller programmed to control operation of the CCMM according to the method of any of paragraphs A1-A45.

B6. The CCMM of any of paragraphs B1-B5, wherein the CCMM further includes any suitable structure described in any of the methods of any of paragraphs A1-A45.

B7. The CCMM of any of paragraphs B1-B6, wherein the CCMM further is configured to perform any suitable function described in any of the methods of any of paragraphs A1-A45.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A continuous compression molding machine (CCMM) comprising:
 a mold configured to shape a thermoplastic matrix composite material (TMCM), which includes a thermoplastic material, to a desired shape for a consolidated thermoplastic matrix composite material, wherein the mold includes a heat zone, a consolidation zone, and a stress relaxation zone;
 a heat zone heating structure;
 a consolidation zone heating structure;
 a stress relaxation zone heating structure;
 a controller programmed to:
 (i) control the heat zone heating structure to heat the heat zone to a heat zone temperature selected to heat the TMCM to an initial temperature that is above a melt temperature for the thermoplastic material;
 (ii) control the consolidation zone heating structure to heat the consolidation zone to a consolidation zone temperature selected to cool the TMCM to a subsequent temperature; and
 (iii) control the stress relaxation zone heating structure to maintain the stress relaxation zone at a stress relaxation zone temperature selected to maintain the TMCM at a stress relaxation temperature;
 a press structure configured to periodically compress the TMCM within the mold to form the TMCM to the desired shape;
 a demold structure configured to demold the TMCM from the mold while the TMCM is at a demold temperature that is greater than a glass transition temperature of the thermoplastic material; and
 a supply structure configured to periodically advance the TMCM through the mold.

2. The CCMM of claim 1, wherein a thickness of the mold defined by the stress relaxation zone is less than a thickness of the mold defined by the consolidation zone.

3. The CCMM of claim 1, wherein the CCMM further includes a support structure configured to receive the TMCM from the demold structure and to support the TMCM.

4. The CCMM of claim 1, wherein the CCMM further includes a quench structure configured to receive the TMCM from the demold structure and to quench the TMCM to a quench temperature.

5. The CCMM of claim 4, wherein the quench temperature is less than the stress relaxation temperature.

6. The CCMM of claim 1, wherein the subsequent temperature is less than the initial temperature and within a rubbery temperature range for the thermoplastic material.

7. The CCMM of claim 1, wherein the stress relaxation temperature is less than the initial temperature and within a rubbery temperature range for the thermoplastic material.

8. The CCMM of claim 1, wherein:
 (i) the subsequent temperature is less than the initial temperature and within a rubbery temperature range for the thermoplastic material; and
 (ii) the stress relaxation temperature is less than the initial temperature and within the rubbery temperature range for the thermoplastic material.

9. The CCMM of claim 1, wherein the press structure is configured to periodically compress the TMCM within the heat zone, the consolidation zone, and the stress relaxation zone.

10. The CCMM of claim 1 wherein the supply structure is configured to periodically advance the TMCM through the mold such that the TMCM extends sequentially through the heat zone, the consolidation zone, the stress relaxation zone, and to the demold structure.

11. The CCMM of claim 1, wherein the mold includes a first mold die, which defines a first mold surface, and a second mold die, which defines a second mold surface that faces toward the first mold surface.

12. The CCMM of claim 11, wherein the mold defines an elongate mold channel that defines the desired shape for the consolidated thermoplastic matrix composite material, wherein the first mold surface extends at least substantially parallel to a first mold surface plane along an entirety of a length of the elongate mold channel, and further wherein the second mold surface extends at least substantially parallel to a second mold surface plane along the entirety of the length of the elongate mold channel.

13. The CCMM of claim 12, wherein a distance between the first mold surface and the second mold surface decreases along the length of the elongate mold channel and from the heat zone to the stress relaxation zone.

14. The CCMM of claim 1, wherein the mold is free of shape compensation for the consolidated thermoplastic matrix composite material.

15. The CCMM of claim 1, wherein at least one of:
 (i) the consolidation zone is free from water cooling; and
 (ii) the stress relaxation zone is free from water cooling.

16. The CCMM of claim 1, wherein the controller further is programmed to control operation of the supply structure such that the demold structure demolds the TMCM from the mold while the TMCM is at the demold temperature.

17. A continuous compression molding machine (CCMM) comprising:
 a mold configured to shape a thermoplastic matrix composite material (TMCM), which includes a thermoplastic material, to a desired shape for a consolidated thermoplastic matrix composite material;
 a heat zone heating structure configured to heat a heat zone of the mold to a heat zone temperature selected to heat the TMCM to an initial temperature;
 a consolidation zone heating structure configured to heat a consolidation zone of the mold to a consolidation zone temperature selected to cool the TMCM to a subsequent temperature;
 a stress relaxation zone heating structure configured to maintain a stress relaxation zone of the mold at a stress relaxation zone temperature selected to maintain the TMCM at a stress relaxation temperature;
 a press structure configured to periodically compress the TMCM within the mold to form the TMCM to the desired shape;
 a demold structure configured to demold the TMCM from the mold while the TMCM is at a demold temperature; and a supply structure configured to periodically advance the TMCM through the mold;

wherein a thickness of the mold defined by the stress relaxation zone is less than a thickness of the mold defined by the consolidation zone.

18. The CCMM of claim 17 wherein the supply structure is configured to periodically advance the TMCM through the mold such that the TMCM extends sequentially through the heat zone, the consolidation zone, the stress relaxation zone, and to the demold structure.

19. A continuous compression molding machine (CCMM) comprising:

a mold configured to shape a thermoplastic matrix composite material (TMCM), which includes a thermoplastic material, to a desired shape for a consolidated thermoplastic matrix composite material, wherein the mold includes a heat zone, a consolidation zone, and a stress relaxation zone;

a heat zone heating structure;

a consolidation zone heating structure;

a stress relaxation zone heating structure;

a controller programmed to:

(i) control the heat zone heating structure to heat the heat zone to a heat zone temperature selected to heat the TMCM to an initial temperature;

(ii) control the consolidation zone heating structure to heat the consolidation zone to a consolidation zone temperature selected to cool the TMCM to a subsequent temperature that is less than the initial temperature and within a rubbery temperature range for the thermoplastic material; and (iii) control the stress relaxation zone heating structure to maintain the stress relaxation zone at a stress relaxation zone temperature selected to maintain the TMCM at a stress relaxation temperature that is less than the initial temperature and within the rubbery temperature range for the thermoplastic material;

a press structure configured to periodically compress the TMCM within the mold to form the TMCM to the desired shape;

a demold structure configured to demold the TMCM from the mold while the TMCM is at a demold temperature; and a supply structure configured to periodically advance the TMCM through the mold.

20. The CCMM of claim 19 wherein the supply structure is configured to periodically advance the TMCM through the mold such that the TMCM extends sequentially through the heat zone, the consolidation zone, the stress relaxation zone, and to the demold structure.

* * * * *